(12) United States Patent
Nowaczyk

(10) Patent No.: US 9,477,916 B2
(45) Date of Patent: Oct. 25, 2016

(54) BARCODE DEVICE

(71) Applicant: Hewlett-Packard Development Company, L.P., Houston, TX (US)

(72) Inventor: David J. Nowaczyk, Howell, MI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/759,863

(22) PCT Filed: Jan. 25, 2013

(86) PCT No.: PCT/US2013/023210
§ 371 (c)(1),
(2) Date: Jul. 8, 2015

(87) PCT Pub. No.: WO2014/116233
PCT Pub. Date: Jul. 31, 2014

(65) Prior Publication Data
US 2015/0356391 A1    Dec. 10, 2015

(51) Int. Cl.
*G06K 7/10* (2006.01)
*G06K 17/00* (2006.01)

(52) U.S. Cl.
CPC ........... *G06K 17/00* (2013.01); *G06K 7/10554* (2013.01); *G06K 7/10722* (2013.01); *G06K 7/10881* (2013.01); *G06K 17/0022* (2013.01)

(58) Field of Classification Search
CPC ............ G06K 17/00; G06K 17/0022; G06K 7/10554; G06K 7/10722; G06K 7/10881
USPC ....................... 235/472.01–472.03
See application file for complete search history.

(56) References Cited

U.S. PATENT DOCUMENTS

| 5,514,861 A | | 5/1996 | Swartz et al. | |
| 5,602,377 A | * | 2/1997 | Beller | G06K 1/121 235/385 |
| 5,969,327 A | * | 10/1999 | Metlitsky | G06K 7/10564 235/462.44 |

(Continued)

FOREIGN PATENT DOCUMENTS

| JP | 2001325019 | 4/2001 |
| JP | 2004228250 | 8/2004 |
| JP | 2010250676 | 11/2010 |
| KR | 10-2001-0025858 | 6/2008 |
| KR | 10-2008-0056326 | 6/2008 |

OTHER PUBLICATIONS

NJ. P.; "KoamTac introduces KDC400 Barcode and MSR Sled for Smartphones and Pads"; http://www.koamtac.com/news.htm; Sep. 20, 2013; 1 page.

(Continued)

*Primary Examiner* — Seung Lee
(74) *Attorney, Agent, or Firm* — Hewlett Packard Enterprise Patent Department

(57) ABSTRACT

A barcode device including a barcode scanner to scan barcode labels and provide raw barcode data signals, a processor to receive and process the raw barcode data signals to provide processed barcode data signals and compare at least two of the processed barcode data signals, an indicator to notify a user of barcode data information based on the receipt of barcode data and comparison performed by the processor, and a housing to contain the barcode scanner, the processor, and the indicator, the housing comprising a first end, an opposing second end, and a body extending between the first end and the second end, the housing configured to couple to a back of a glove.

14 Claims, 5 Drawing Sheets

(56) References Cited

U.S. PATENT DOCUMENTS

| | | | |
|---|---|---|---|
| 6,234,393 B1 | 5/2001 | Paratore et al. | |
| 7,720,567 B2 | 5/2010 | Doke et al. | |
| 7,837,112 B2 | 11/2010 | An | |
| 7,878,408 B2 | 2/2011 | Lapstun et al. | |
| 8,157,176 B2 * | 4/2012 | May | B41J 3/36 |
| | | | 235/375 |
| 8,292,184 B2 | 10/2012 | Turbovich | |
| 9,065,924 B2 * | 6/2015 | Le | H04M 1/7253 |
| 2010/0261430 A1 | 10/2010 | Parias | |

OTHER PUBLICATIONS

PCT; "Notification of Transmittal of the International Search Report and the Written Opinion of the International Searching Authority, or the Declaration"; cited in PCT/US2013/023210; mailed 24 Oct. 2013; 12 pages.

NJ, P.; "KoamTac Introduces KDC400 Barcode and MSR Sled for Smartphones and Pads"; http://www.koamtac.com/news.htm; 1 page, Sep. 20, 2011.

* cited by examiner

BARCODE DEVICE

BACKGROUND

Products often include coded labels, such as barcodes, which are used to identify and track products in shops, supermarkets, warehouses, and other commercial and industrial settings. Stationary or handheld barcode scanners can be used to read the barcode's image data and send the barcode's content out via an output port for analyzing and processing at a processing station.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined with each other, unless specifically noted otherwise.

The same assembly line can be used to manufacture products with differing specific features. As an object moves along an assembly line, various individual parts are added to complete the final product. Accordingly, at any given assembly station, there can be multiple parts from which the appropriate part is selected and installed.

Often the identification and selection of the appropriate part is completed by visual identification by an operator at the assembly station in a two-step process. First, the operator visually identifies the appropriate part being requested on the assembly line product. Second, the operator visually identifies the appropriate part by matching the part requested from a group of nearby parts. Often the parts in the group of parts at a particular assembly station have similar features. For example, emblems to be installed on a vehicle at an assembly station can include 300, 300C, and 300SC. Due to the speed of the assembly line, the operator quickly identifies and selects the appropriate part. When an inappropriate part with an incorrect feature is selected and installed, delays and additional costs are incurred to remove the inappropriate part, repair any damage caused, and install the appropriate part with the correct feature. Often the assembly line is temporarily shut down to complete the corrections.

In a manufacturing environment, an operator typically wears some type of protective glove. The glove can be fingerless or include covering for all five digits. The glove can be made of a fabric or a knit material made of cotton, for example, or other suitable material. The type of glove depends on the manufacturing task(s) performed by the operator.

Industrial manufacturing applications can include barcodes to facilitate manufacturing and logistics, for example, on assembly lines. Barcode labels can be attached to individual parts to identify and track parts during a manufacturing process.

Figure 1:
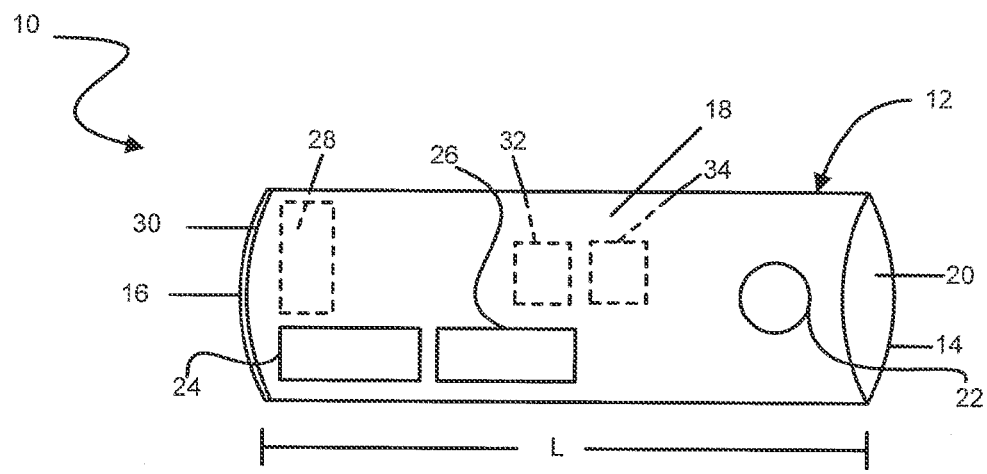
FIG. 1 is a diagram of an example barcode device.

FIG. 1 illustrates an example of a barcode processing device 10. Device 10 includes a housing 12 having a first end 14, an opposing second end 16, and a body 18 extending between first end 14 and second end 16. A scanner 20 is positioned at first end 14. Housing 12 holds a processor 34 and a memory 32. Features of these elements can be combined or individually separated. For example, processor 34 can include part or all of memory 32. Aspects are described further below. Device 10 is a wireless device and includes an energy source, such as a battery 28, contained within housing 12. A switch 24 can be positioned on housing 12 to provide a manual activation and deactivation of device 10. An indicator 22 is formed into housing 12 and provides user notification. Additionally, a volume control 26 can be coupled to housing 12 for control of an audible signal.

As illustrated in FIG. 1, housing 12 is a single contiguous body. First end 14 is open, or transparent, to provide an optical opening for scanner 20. In one embodiment, housing 12 is generally linear and can be cylindrical or rectangular, for example. Generally, a length "L" of body 18 is equal to or less than the distance between a user's metacarpophalangeal joints and wrist. In one embodiment, length "L" of body 18 is approximately 1" to 3". Housing 12 has a low profile with length "L" of body 18 being greater than a width or height of body 18. In one embodiment, housing 12 is rigid. Embodiments of housing 12 are made from lightweight and durable material, such as aluminum or plastic, for example.

Device 10 is a wireless device. Operation is powered by battery 28, which can be rechargeable. Housing 12 can include a removable portion 30, either at end 16 or along body 18, to allow for battery replacement. Alternatively, device 10 is rechargably power operated and end 16 includes a port for connection to a charging docking station. In one embodiment, device 10 remains activated for the entire time in use, for example, the length of a work shift. In one embodiment, switch 24 is a toggle style switch that is depressed by a user to power device 10 on and off.

Scanner 20 can be selected from available forms of barcode scanners, or barcode readers, and is an electronic device for reading printed barcodes. For example, scanner 20 can be a laser scanner, a Charge Coupled Device (CCD) scanner, or other type of available scanners. Scanner 20 will typically include a light source, a lens and a light sensor. Scanner 20 can be a pen or wand-type reader wherein the operator swipes the pen over the barcode. In a pen reader, for example, a light source and a photodiode are place next to each other in the tip or the reader and the operator moves the reader across the bars of the barcode in a steady motion. In a wand-type laser scanner, a laser beam is the light source and either a reciprocating mirror or a rotating prism is used to scan the laser beam back and forth across the barcode; a photodiode is used to measure the intensity of the light reflected back from the barcode. In a CCD scanner, for example, multiple tiny light sensors are lined up in a row in the head of the reader.

Memory 32 can include memory storage suitable for a 24 hour work shift, for example. In one embodiment, memory 32 includes eight gigabytes of memory storage, although other storage amounts are suitable depending on the particular application. Processor 34 includes comparison based capabilities. Processor 34 uses a suitable software application stored in memory 32. Processor 34 receives raw image data from the scanned barcode and processes the data in accordance with software instructions to generate a "received", "match", "non-match", or other appropriate output signal programmed to be associated with the barcode data. For example, once a set of barcodes has been scanned, electrical signals are communicated to processor 34, and through software, a second barcode matching, or not matching, a first barcode is identified.

Processor 34 can include writable and readable memory. In one embodiment, processor 34 receives data related to the barcodes from a computing system. In one embodiment, processor 34 retains and tracks data related to received, match, and non-match barcode scans. In one embodiment, the retained data can be downloaded to a computing system through a wireless transmission or by docking the device. In one embodiment, device 10 can provide audit reporting of the scanned and retained data. In one embodiment, device 10 is coupled to a docking station to transfer data and programming information and refresh the data storage of processor 34. Alternatively, the data can be transferred wirelessly. Device 10 operates in wireless networks according to IEEE 802.11g Wireless Local Area Network (WLAN) or IEEE 802.15.3 (Bluetooth®), for example.

A signal notification is generated by processor 34 and produced by indicator 22, based on the barcode data received. In one embodiment, indicator 22 emits an audible signal notification. Indicator 22 can include a speaker within housing 12 to provide the audible signal notification. Alternatively, and with reference to FIGS. 3A and 3B, device 10 cans wirelessly transmit, by Bluetooth®, for example, the audible signal notification to an earpiece 52 worn by the operator. Device 10 can wirelessly interface with earphone 52 to notify the operator of received barcode data, matching or non-matching barcode. With reference to FIG. 1, volume control 26 can be included on housing 12 when indicator 22 produces an audible signal notification.

Alternatively, or in addition, indicator 22 includes a visual signal such as a light. In one embodiment, indicator 22 illuminates to notify the operator of a received barcode data, a barcode match, a barcode non-match, or other appropriate information. In one embodiment, indicator 22 illuminates in one of a variety of colors or patterns to indicate either a first barcode data received, a match of a second barcode data to the first barcode data, or a non-match of the second barcode data to the first barcode data. In one embodiment, indicator 22 includes a small Light Emitting Diode (LED) display which can provide word messages.

Figure 2:
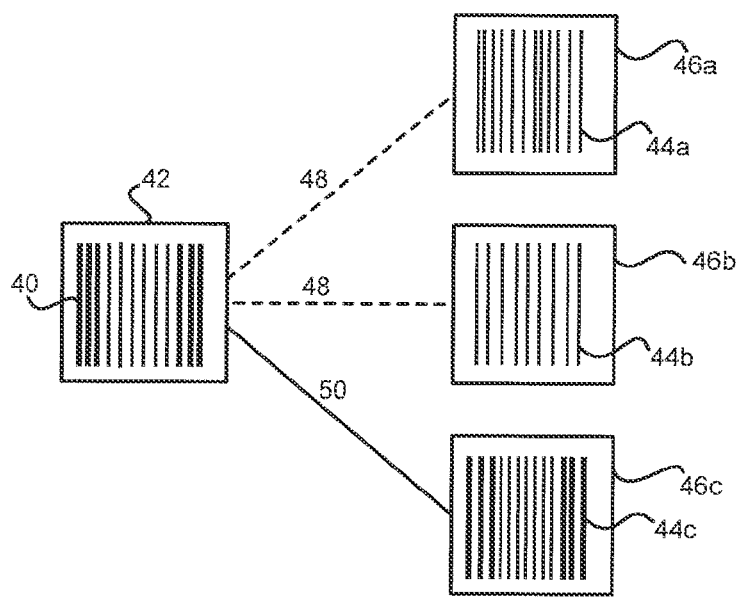
FIG. 2 is a block diagram of example barcodes configured to be processed by an example barcode device.

FIG. 2 illustrates a block diagram of barcodes configured to be processed by device 10. A barcode 40 is on a first label 42. A group of second barcodes 44a, 44b, 44c are on a group of corresponding second labels 46a, 46b, 46c. Barcode 44c of the second group of barcodes 44a, 44b, 44c is a match (represented by solid line 50) to barcode 40. Barcodes 44a and 44b of the second group of barcodes 44a, 44b, 44c are non-matches (represented by dashed lines48) to barcode 40. In one example of a manufacturing assembly line environment, labels 42, 46a, 46b, and 46c are on product parts and barcodes 40, 44a, 44b, and 44c are product part barcodes.

Figure 3A:
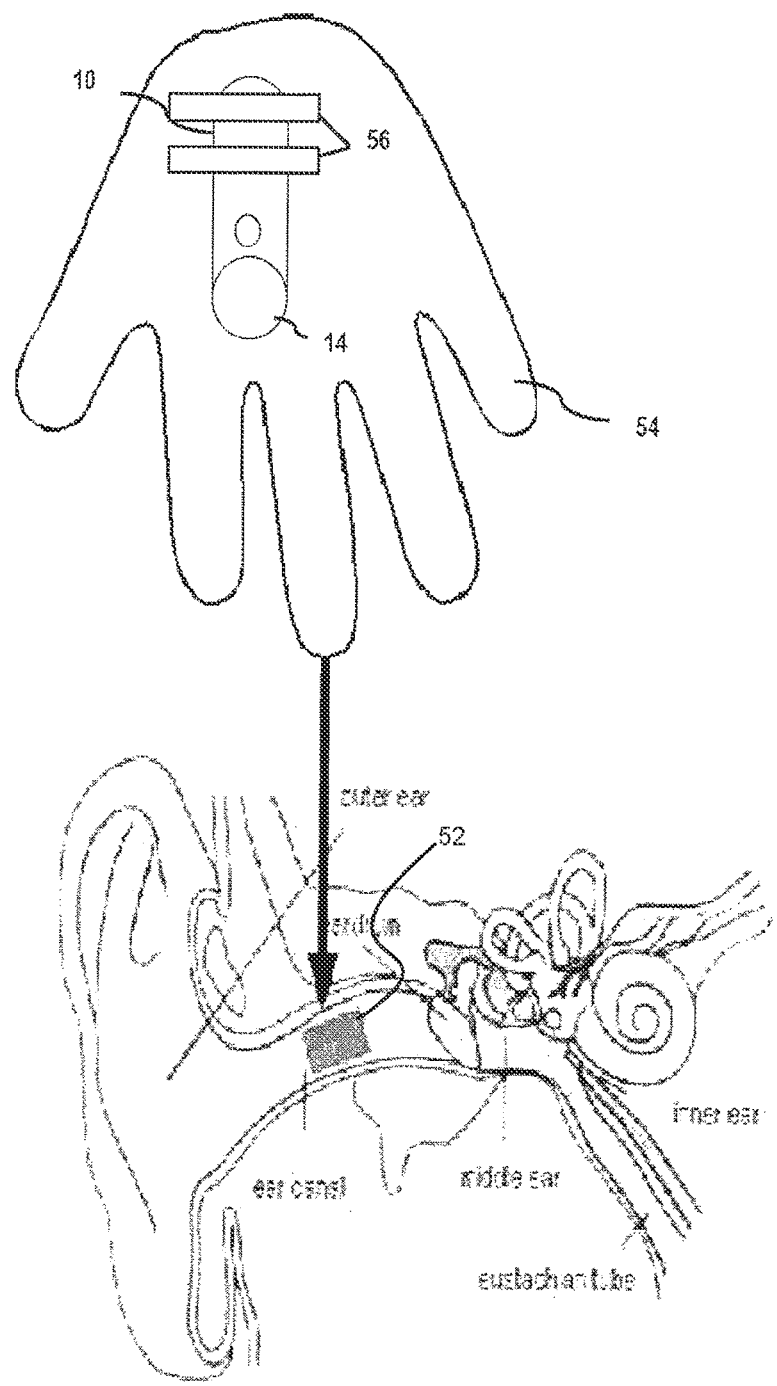
FIGS. 3A and 3B are diagrams of example barcode devices employed with a glove and earpiece.
Figure 3B:
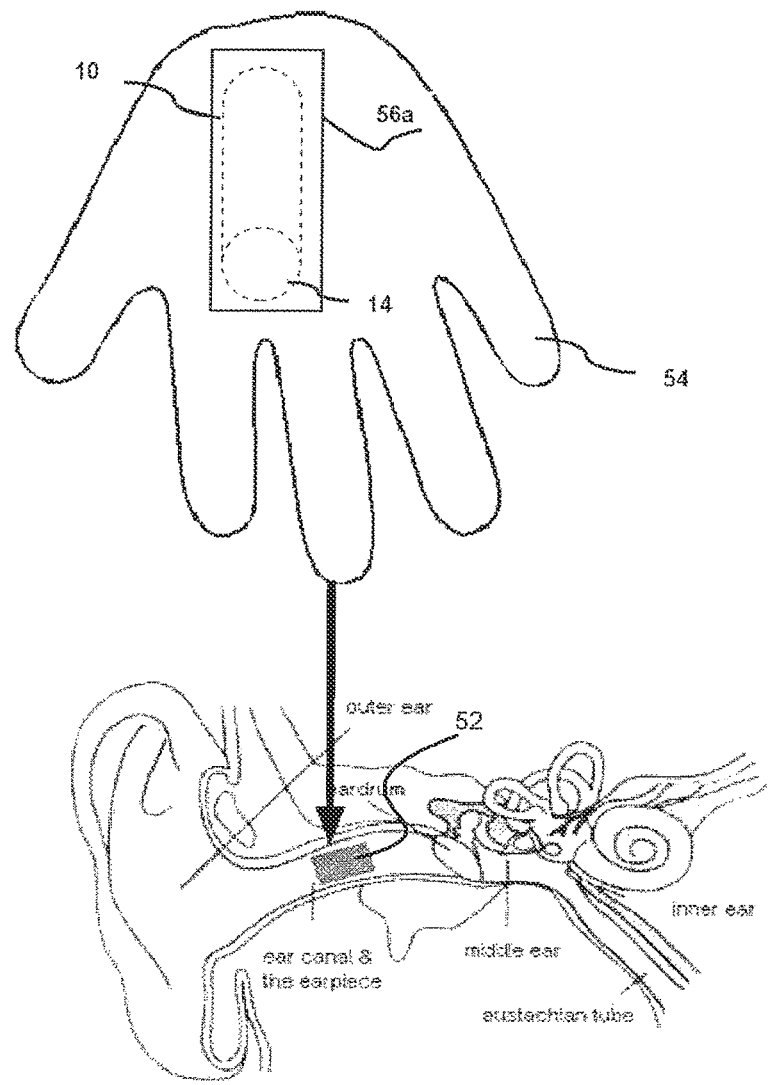

FIGS. 3A and 3B illustrates examples of device 10 used with a glove 54 and earpiece 52. Device 10 is coupled to glove 54 to be worn by an operator. As discussed above, glove 54 is flexible and made of any type of material suitable for protection and for accomplishing the operator's tasks. Device 10 is positioned on the back of an operator's hand on glove 54 with first end 14 oriented toward the fingers. In this manner, the operator's hands remain free to handle objects or goods while scanning or completing other tasks. The operator will not have to remove glove 54 to perform typical manual tasks such as operating machinery, lifting objects, assembling products because glove 54 positions device 10 in a way that allows normal use of the operator's hand and arm.

Device 10 is suitable to be attached to any sized glove, thus operators of various hand size can use device 10. Device 10 is securely and removably attached to glove 54. Device 10 is securely attached to glove 54 with attachment mechanism 56. In one embodiment, as illustrated in FIG. 3A, attachment mechanism 56 includes at least one strap or band extending to and/or around glove 54 or a bare hand of the operator. In another embodiment, as illustrated in FIG. 3B, attachment mechanism includes a pocket 56a that houses device 10. Pocket 56a can be of a transparent material or open at one end to provide an optical opening for scanner 20. Other suitable attachment mechanisms 56 can be employed that securely and removably attach device 10 to glove 54. Attachment mechanism 56 is configured to provide against dislodgement of device 10 during hand movements of the operator, while allowing for device 10 to be uncoupled when desired.

Figure 4:
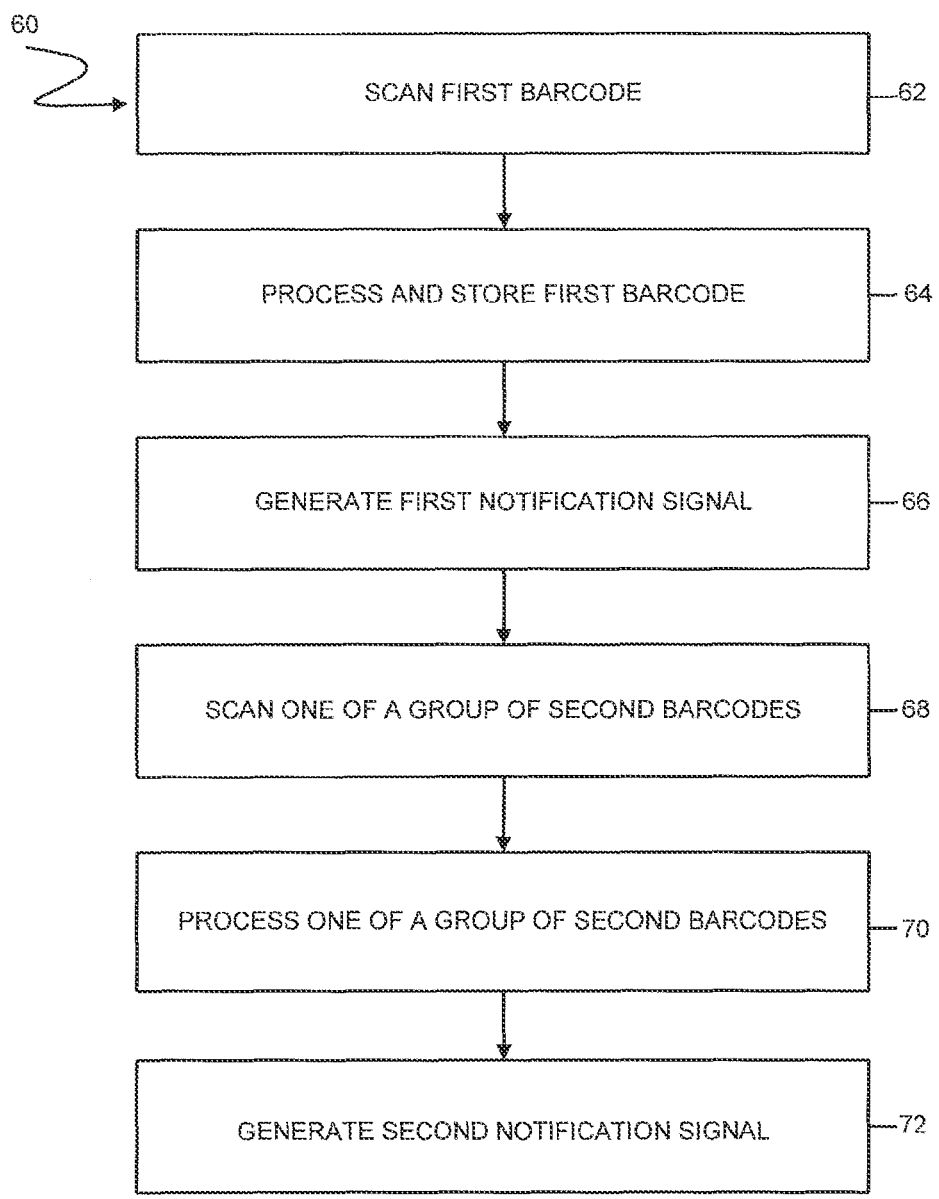
FIG. 4 is a flow diagram illustrating an example method for barcode management.

FIG. 4 illustrates a flow chart of an example method 60 of product management using barcode device 10. Method 60 can be a method for managing manufacturing a product on an assembly line. At 62, a first barcode is scanned. The results of the scan are first raw signal data. At 64, first barcode data is processed and stored. Raw barcode data signals are transformed into processed barcode data signals. At 66, a first user notification is generated. First user notification indicates receipt status by the device of first barcode data. At 68, one of a group of second barcodes is scanned. The results of the scan are second raw signal data. At 70, one of the group of second barcodes data is processed. The second raw barcode data signals are transformed into processed barcode data signals and compared to the first processed barcode data. At 72, a second user notification is generated. Second user notification indicates receipt status of second barcode data and/or a match or non-match of the one of the group of second barcode data to the first barcode data.

Figure 5:
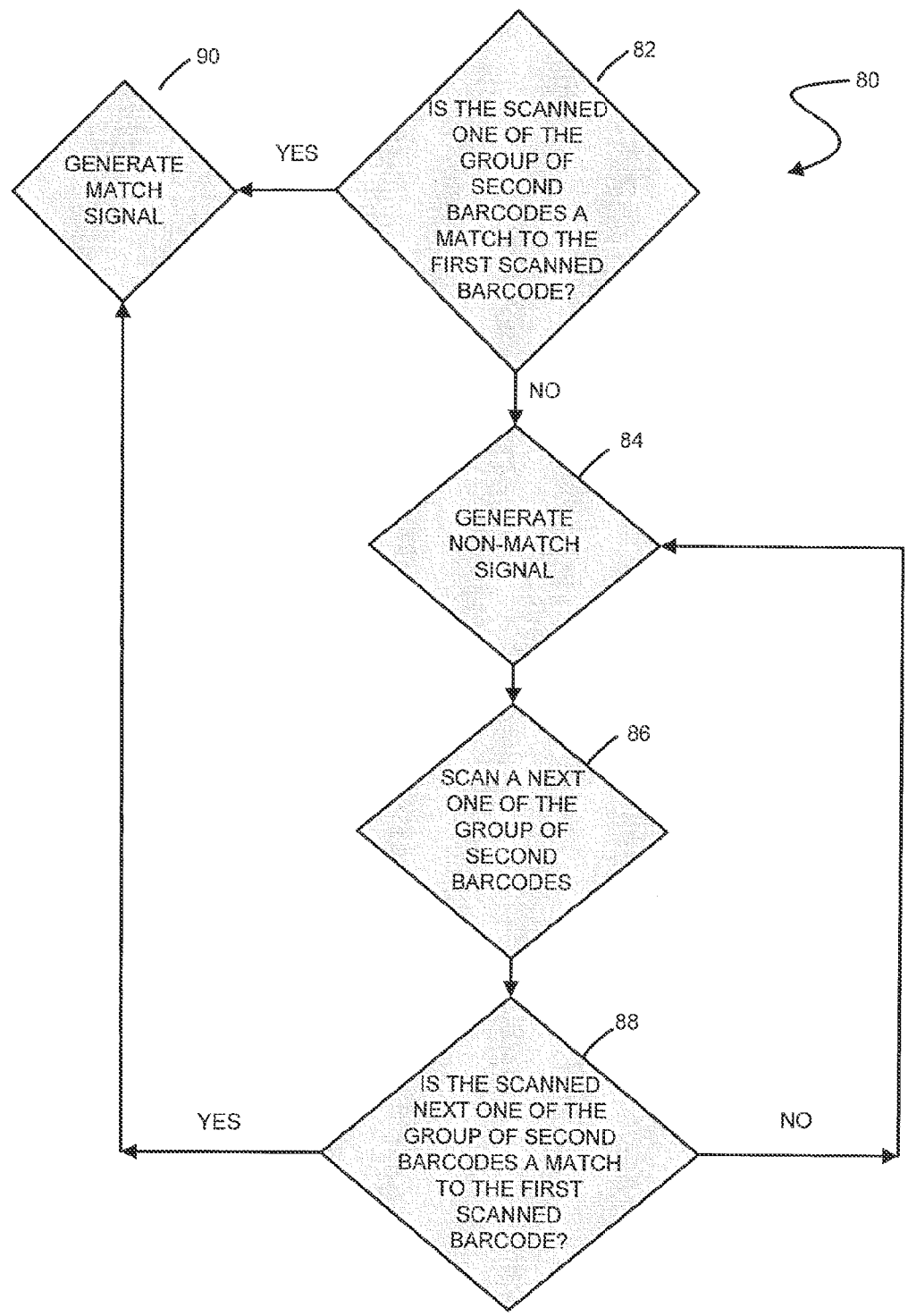
FIG. 5 is a flow diagram illustrating an example method for barcode management using the barcode device.

FIG. 5 is a flow diagram illustrating an example method 80 of barcode management using device 10. Method 80 can begin at step 82 where processor 34 of device 10 determines if a one of a group of second barcodes matches a first scanned barcode. When a non-match is determined, method 80 can proceed to step 84. When a match is determined, method 80 can proceed to step 90. In step 90, a match signal is generated. If the data of the second barcode matches the data of the first barcode, a match signal is generated to notify the operator. In step 84, a non-match signal is generated. If the data of the second barcode does not match the data of the first barcode, a non-match signal is generated to notify the operator. In step 86, a next one of the group of second barcodes is scanned. In step 88, processor 40 determines if the next one of the group of second barcodes matches the first scanned barcode. When a non-match is determined, method 80 can proceed to step 84. When a match is determined, method 80 can proceed to step 90. Method 80 continues until such time as a barcode match occurs. Method 80 is terminated by a barcode match reading. Method 80 can be restarted with a new first barcode scan. Method 80 can be employed for managing manufacturing a product on an assembly line, for example.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A barcode device, comprising:
    a barcode scanner to scan barcode labels and provide raw barcode data signals;
    a processor to receive and process the raw barcode data signals to provide processed barcode data signals and compare at least two of the processed barcode data signals;
    an indicator to notify a user of barcode data information based on the receipt of barcode data and comparison performed by the processor;
    a housing to contain the barcode scanner, the processor, and the indicator, the housing comprising a first end, an opposing second end, and a body extending between the first end and the second end, the housing configured to couple to a back of a glove; and
    an earpiece to interface with the housing containing the barcode scanner, and produce an audible indication of a barcode match between the at least two processed barcode data signals.

2. The device of claim 1, wherein the body of the housing is generally linear.

3. The device of claim 1, wherein the body has a length equal to or less than the distance between a user's metacarpophalangeal joints and wrist.

4. The device of claim 1, wherein the body has a length of approximately 1" to 3".

5. The device of claim 1, wherein the indicator is to produce a group of programmed signals.

6. The device of claim 1, wherein the indicator is a visual indicator.

7. The device of claim 1, wherein the indicator is an audible indicator.

8. The device of claim 7, comprising:
    a volume control on the housing.

9. The device of claim 1, wherein the barcode scanner is positioned at the first end of the housing.

10. The device of claim 1, wherein the processor produces audit reporting of scanned data.

11. A method for managing manufacturing a product on an assembly line, the method comprising:
    providing a barcode device including a barcode scanner, a processor, and an indicator;
    scanning a first barcode with the barcode scanner;
    processing data corresponding to the scanned first barcode;
    producing a first user notification of the first barcode data received;
    scanning one of a group of second barcodes with the barcode scanner;
    processing scanned data corresponding to the scanned second barcode;
    producing a second user notification indicating a barcode match between the scanned first barcode and the scanned second barcode;
    sending, from the processor to an earpiece, a signal indicating the barcode match between the scanned first barcode and the scanned second barcode; and
    producing, by the earpiece, an audible indication indicating the barcode match between the scanned first barcode and the scanned second barcode.

12. The method of claim 11, wherein the indicator provides visual user notifications.

13. The method of claim 11, wherein the user notifications are wirelessly transmitted to the earpiece.

14. The method of claim 11, comprising:
    attaching the barcode device to a glove.

* * * * *